United States Patent
Narin et al.

(10) Patent No.: US 11,779,895 B2
(45) Date of Patent: Oct. 10, 2023

(54) METHOD FOR OPERATING A FLUIDIZED BED APPARATUS AND FLUIDIZED BED APPARATUS

(71) Applicant: DOOSAN LENTJES GMBH, Nordrhein-Westfalen (DE)

(72) Inventors: Oguzhan Narin, Sprockhövel Nordrhein-Westfalen (DE); Björn Brosch, Essen Nordrhein-Westfalen (DE); Sebastian Krusch, Bochum (DE)

(73) Assignee: DOOSAN LENTJES GMBH, Nordrhein-Westfalen (DE)

( * ) Notice: Subject to any disclaimer, the term of this patent is extended or adjusted under 35 U.S.C. 154(b) by 0 days.

(21) Appl. No.: 17/417,372

(22) PCT Filed: Feb. 19, 2021

(86) PCT No.: PCT/EP2021/054097
§ 371 (c)(1),
(2) Date: Jun. 22, 2021

(87) PCT Pub. No.: WO2021/165441
PCT Pub. Date: Aug. 26, 2021

(65) Prior Publication Data
US 2022/0379280 A1    Dec. 1, 2022

(30) Foreign Application Priority Data
Feb. 20, 2020   (EP) .................................... 20158492

(51) Int. Cl.
*B01J 8/38*    (2006.01)
*B01J 4/00*    (2006.01)
(Continued)

(52) U.S. Cl.
CPC .............. *B01J 8/388* (2013.01); *B01J 4/002* (2013.01); *B01J 8/005* (2013.01); *C25B 1/02* (2013.01);
(Continued)

(58) Field of Classification Search
CPC .. B01J 8/388; B01J 8/005; B01J 8/008; F23C 10/26; F23C 10/28; F23C 2900/99008; F23C 2900/10001; C01B 3/105
See application file for complete search history.

(56) References Cited

U.S. PATENT DOCUMENTS 4,192,371 A * 3/1980 Derouette ............... F24V 30/00
48/209
2011/0117004 A1   5/2011 Lamont et al.

FOREIGN PATENT DOCUMENTS

| EP | 3617590 A1 * | 4/2020 |
| WO | 2017-127886 A1 | 8/2017 |
| WO | 2019-050397 A1 | 3/2019 |

OTHER PUBLICATIONS

Shah Kalpit et al./Fuel 107 (2013)356-370.
(Continued)

*Primary Examiner* — Lessanework Seifu
(74) *Attorney, Agent, or Firm* — INVENSTONE Patent, LLC

(57) ABSTRACT

The present invention relates to a method for operating a fluidized bed apparatus and to a fluidized bed apparatus, the method comprising the following steps: providing particulate metal to a reaction chamber of a fluidized bed reactor, providing an oxidizing agent to a fluidizing bottom of the fluidized bed reactor such that particulate matter comprising the particulate metal is fluidized, wherein the particulate metal reacts with the oxidizing agent to particulate metal oxide, withdrawing particulate metal oxide from the reaction chamber, storing the withdrawn particulate metal oxide,
(Continued)

providing particulate metal oxide to the reaction chamber of the fluidized bed reactor, providing a reducing agent containing gas to the fluidizing bottom of the fluidized bed reactor such that particulate matter comprising the particulate metal oxide is fluidized, wherein the particulate metal oxide reacts with the reducing agent to particulate metal, withdrawing the particulate metal from the reaction chamber, storing the withdrawn particulate metal.

16 Claims, 1 Drawing Sheet

(51) Int. Cl.
*B01J 8/00* (2006.01)
*C25B 1/02* (2006.01)
*F23C 10/10* (2006.01)
*F23C 10/20* (2006.01)
*F23C 10/26* (2006.01)

(52) U.S. Cl.
CPC .............. *F23C 10/10* (2013.01); *F23C 10/20* (2013.01); *F23C 10/26* (2013.01); *B01J 2204/002* (2013.01); *F23C 2900/10001* (2013.01)

(56) References Cited

OTHER PUBLICATIONS

A Chinese Office Action dated Nov. 14, 2022 in connection with Chinese Patent Application No. 202180001704.9 which corresponds to the above-referenced U.S. application.

* cited by examiner

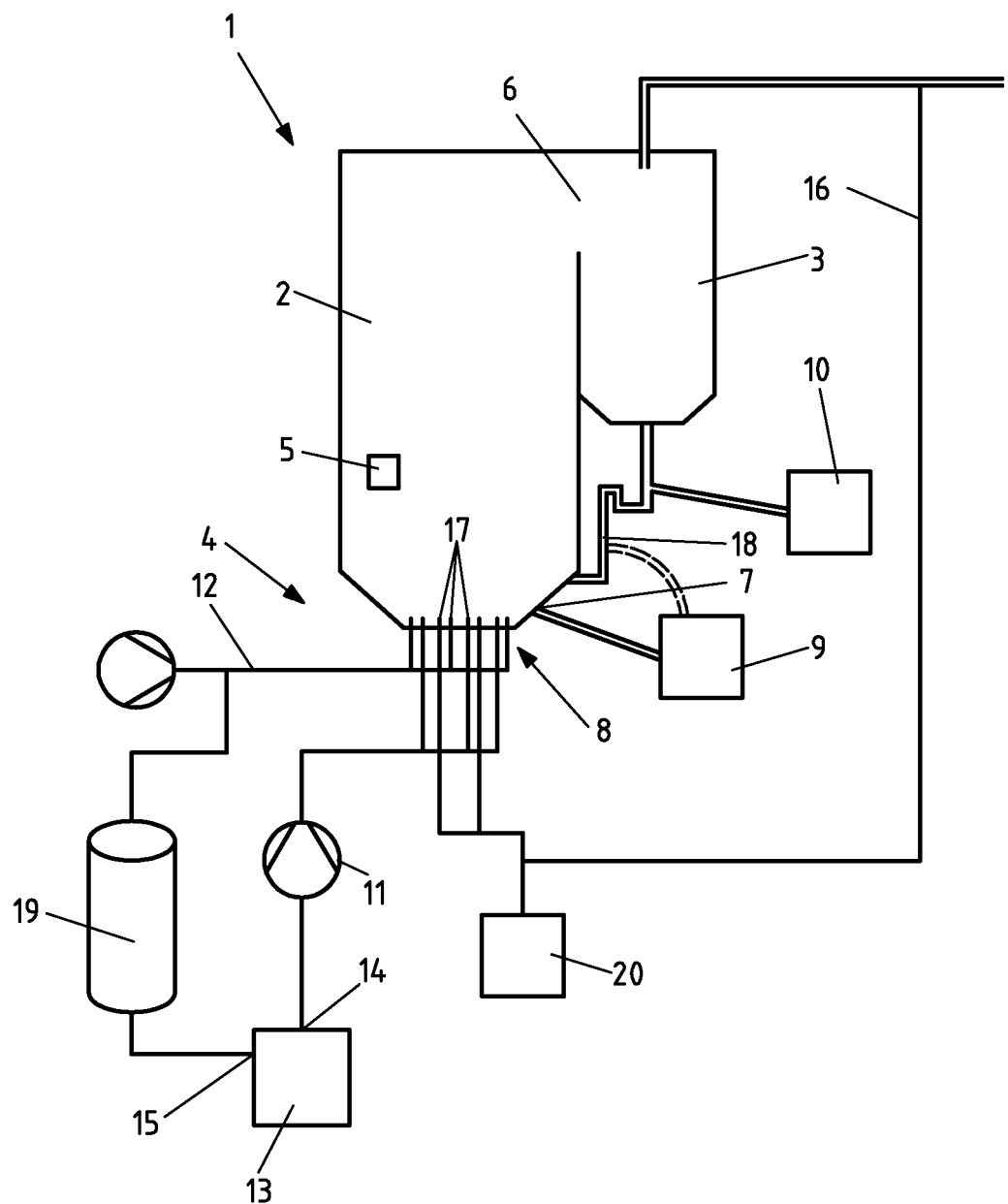

METHOD FOR OPERATING A FLUIDIZED BED APPARATUS AND FLUIDIZED BED APPARATUS

CROSS-REFERENCE TO RELATED APPLICATIONS

This application is a national stage of International Application No. PCT/EP2021/054097, filed on Feb. 19, 2021, which claims the benefit of priority to European Application No. 20158492.7, filed on Feb. 20, 2020 in the EPO, the disclosures of which are incorporated herein by reference.

BACKGROUD

Technical Field

The present invention relates to a fluidized bed apparatus and in particular to a circulating fluidized bed apparatus (CFBA) and to a method for operating such a fluidized bed apparatus. Hereinafter terms like "upper", "lower", "horizontal", "vertical", "inner" etc. always refer to a regular used position of the fluidized bed apparatus. A fluidized bed apparatus typically comprises a fluidized bed reactor, which walls are made of tubes, through which water runs, wherein said tubes are either welded directly to each other to provide a wall structure or with fins/ribs between parallel running tube sections. The wall of the fluidized bed reactor may also be made of bricks or bricks in combination with tubes.

Related Art

Typically, the reaction chamber of such a fluidized bed reactor has at least one reaction chamber outlet at its upper end, wherein said reaction chamber outlet allows a mixture of reaction gases and solid particles (hereinafter called particulate matter) exhausted from the reaction chamber to flow into at least one separator.

The separator serves to disengage the reaction gases and particulate matter. Thereafter the separated reaction gases and the particulate matter are treated separately. The particulate matter may be directly returned into the reaction chamber.

The general design of a circulating fluidized bed apparatus and its components is disclosed in EP 0 495 296 A2.

The general process engineering of this type of a fluidized bed apparatus is more or less defined and includes:
- providing the particulate matter via an inlet opening into the reaction chamber,
- fluidizing the particulate matter by a (operating) gas, introduced under pressure via a fluidizing bottom, which may comprise respective nozzles and/or a grate in the bottom area of the reaction chamber,
- transferring the energy (heat) produced in the fluidized bed via heat transfer elements (in particular tubes through which a heat transfer fluid like water or steam flows), arranged in or adjacent to the reaction chamber or transferring the energy from the reaction gases having left the reaction chamber.

Depending on the velocity of the provided operating gas the fluidized bed can be embodied as stationary, bubbling or circulating fluidized bed.

US 2009/0072538 A teaches that a first fluidized bed apparatus is used as an oxidation reactor, in which particulate metal is combusted with oxidizing agent provided through the fluidizing bottom and that a second fluidized bed apparatus is used as a reduction reactor, in which particulate metal oxide is reduced by providing a reducing agent through the fluidizing bottom of the second fluidized bed apparatus. This system of a combination of the reduction reactor and oxidation reactor is used to drive a turbine for generating electricity, wherein the produced carbon dioxide is stored under high pressure.

SUMMARY

In the present times there is the demand to store (electrical) energy, in case there is a surplus of electrical energy for example produced from renewable energy sources. Therefore, it is known to run an electrolysis unit for producing oxygen and hydrogen and to store the produced gaseous hydrogen under pressure. In case the demand for electrical energy is higher than the electrical energy supplied by the renewable energy sources or other sources, the stored gaseous hydrogen can be used to provide (electrical) energy.

Nevertheless, storing gaseous hydrogen requires complex and costly storage vessels.

Against this background, it is an object of the present invention to provide a fluidized bed apparatus and a method for operating a fluidized bed apparatus with which electrical energy can be temporarily stored.

BRIEF DESCRIPTION OF THE DRAWING

FIG. 1 illustrates an exemplary embodiment of the invention.

DETAILED DESCRIPTION OF THE DRAWING

FIG. 1 illustrates an exemplary embodiment of the invention.

This object is achieved with a method for operating a fluidized bed apparatus and a fluidized bed apparatus with the features of the respective independent claim. Preferred embodiments of the method and the fluidized bed apparatus are subject matter of the dependent claims and the description, wherein single features of the preferred embodiments can be combined with each other in a technically meaningful manner. Features disclosed with regard to the method can be applied to the fluidized bed apparatus and vice versa.

The object is in particular achieved with a method for operating a fluidized bed apparatus, comprising the following steps:
1a) Providing particulate metal to a reaction chamber of a fluidized bed reactor,
1b) Providing an oxidizing agent (such as an oxygen containing gas, in particular air) to a fluidizing bottom of the fluidized bed reactor such that particulate matter comprising the particulate metal is fluidized, wherein the particulate metal reacts with the oxidizing agent to particulate metal oxide,
1c) Withdrawing particulate metal oxide from the fluidized bed apparatus,
1d) Storing the withdrawn particulate metal oxide,
2a) Providing particulate metal oxide to the reaction chamber of the fluidized bed reactor,
2b) Providing a reducing agent containing gas to the fluidizing bottom of the fluidized bed reactor such that particulate matter comprising the particulate metal oxide is fluidized, wherein the particulate metal oxide reacts with the reducing agent to particulate metal,
2c) Withdrawing the particulate metal from the fluidized bed reactor and
2d) Storing the withdrawn particulate metal.

The object is also achieved by a fluidized bed apparatus comprising a fluidized bed reactor, the fluidized bed reactor having a reaction chamber for particulate matter, a fluidizing bottom with at least one gas inlet for an operating gas to fluidize the particulate matter and preferably a particulate matter separator for separating particulate matter from a reaction gas. The fluidized bed apparatus further comprises a particulate metal storage vessel connected to the fluidized bed reactor, a particulate metal oxide storage vessel connected to the fluidized bed reactor, a reducing agent supply connectable to the fluidizing bottom of the fluidized bed reactor and an oxidizing agent supply connectable to the fluidizing bottom of the fluidized bed reactor.

Accordingly, the present invention suggests to operate the same fluidized bed reactor as reduction reactor and alternating as oxidation reactor. For example, if there is a surplus of electrical energy derived from renewable energy sources, the particulate metal oxides can react within the fluidized bed with the provided reducing agent (i.e., hydrogen from an electrolysis unit run with electricity from renewable energy sources), whereas the thereby produced particulate metal is withdrawn from the fluidized bed reactor and stored in the particulate metal storage vessel. In case there is a demand for additional energy, the same fluidized bed reactor is operated as oxidation reactor, in which case the particulate metal is combusted with the oxidizing agent, in particular oxygen, which oxygen might be provided with air as operating gas.

Alternatively, in step 1b) water steam may be supplied, in which case the particulate metal reacts with the water steam to particulate metal oxide and gaseous hydrogen. The thereby produced particulate metal oxide can be withdrawn and stored in the particulate metal oxide storage vessel.

Therefore, according to the present invention electrical energy might be stored in the form of particulate metal, whereas the energy may be recovered with the same fluidized bed reactor which is used to store the electrical energy. As storing particulate metal and also particulate metal oxide for example in a stockpile or in a simple storage vessel for particulate matter is much easier than storing gaseous hydrogen under pressure, the present invention provides an alternative way to store electrical energy in solid form. The storing is highly efficient as the contact between the particulate matter and the operating gas is highly efficient within the fluidized bed, whereby also the heat transfer from the fluidized bed to a heat transfer medium might be highly efficient in a fluidized bed reactor.

In addition to the particulate metal or in addition to the particulate metal oxide (depending on step 1 or 2) the particulate matter within the reaction chamber may comprise (preferably inert) carrier material, which does not react with the oxidizing agent and/or reducing agents, so that the oxidation (combustion) process and reduction process can be controlled by the ratio of particulate metal (or particulate metal oxide, respectively) and particulate carrier material. The particulate matter may be provided as lose filling within the reaction chamber.

For example, the particulate metal initially provided in step 1a) and/or during the reaction of step 1b) may comprise 60% to 90%, preferably 70% to 80% of particulate (elementary) metal and 10% to 40%, preferably 20% to 30% of particulate carrier material including particulate metal oxide. During the combustion/oxidation the ratio of particulate carrier material may rise, due to the combustion/oxidation particulate, in particular if no further particulate metal is added to the combustion chamber. On the other hand, the particulate matter in the reaction chamber initially provided at method step 2a) or present during the reaction of method step 2b) may comprise 60% to 90%, preferably 70% to 80% of particulate metal oxide and 10% to 40%, preferably 20% to 30% of particulate carrier material including particulate metal. During the reduction process the ratio of particulate carrier material may rise, due to the reduction process, in particular if no further particulate metal oxide is added to the reaction chamber.

Preferably, while oxidizing the particulate metal during method steps 1a) to 1d) particulate metal is provided from the particulate metal storage in such an amount, that the amount of particulate metal of the particulate matter within the reaction chamber is constant. On the other hand, during reduction of the particulate metal oxide during method steps 2a) to 2d) the particulate metal oxide is provided from the particulate metal oxide storage in such an amount, that the amount of particulate metal oxide within the particulate matter is constant.

Accordingly, the particulate matter stored in the particulate metal storage comprises predominantly particulate metal produced in the fluidized bed reactor, whereas the stored particulate matter may also comprise particulate carrier material including particulate metal oxide. Also, the particulate matter stored in the particulate metal oxide storage vessel comprises predominantly particulate metal oxide and particulate carrier material including particulate metal.

The particulate matter separator as part of the fluidized bed reactor may be embodied as cyclone separator or any other suitable separator, wherein the outlet of the particulate matter separator for particulate matter may be connected to the reaction chamber via a returning line. Additionally, or alternatively, the outlet of the particulate matter separator for particulate matter may be directly or indirectly connected to the particulate metal storage and/or to the particulate metal oxide storage. This connection between the fluidized bed reactor and the particulate metal storage and/or particulate metal oxide storage may be embodied such that particulate matter may be withdrawn from or fed to the fluidized bed reactor.

Furthermore, the particulate metal storage and/or the particulate metal oxide storage may be connected to the lower section of the reaction chamber preferably near (for example above or below) the fluidizing bottom so that particulate matter can be withdrawn from or fed to the fluidized bed reactor.

As the particulate metal is highly reactive, an inert gas (such as $N_2$) may be supplied to the particulate metal storage vessel.

In particular, the outlet of the particulate matter separator for the reaction gas may be connected directly or indirectly to a recirculation line, which recirculation line may be connectable to the fluidizing bottom.

In case the fluidized bed reactor is operated as oxidation reactor, the fluidizing bottom as a whole or only a part of the fluidizing bottom is connected to the oxidizing agent supply, for example a pump supplying air to the oxidizing bottom.

In case the fluidized bed reactor is operated as reduction reactor the fluidizing bottom as a whole or only part of the fluidizing bottom is connected to a reducing agent supply with which a reducing agent gas can be supplied to the fluidizing bottom.

The fluidizing bottom may be connected to a supply of water ($H_2O$) steam, in which case the fluidized bed reactor provided with particulate metal may be used to produce gaseous hydrogen, wherein the derived particulate metal oxide may be withdrawn. Accordingly, the same fluidized bed reactor may even be used for a third application, namely producing gaseous hydrogen from the particulate metal.

In all cases the respective supply may also be provided to the recirculation line, so that reaction gases may be provided together with the operating gases in order to provide the desired volume flow for fluidization.

In case the fluidizing bottom comprises two or three groups of nozzles, each group of nozzles is directly connected to the reducing agent supply, to the oxidizing agent supply and to the water steam supply, whereas the respective supply can be operated when desired. Alternatively, the complete fluidizing bottom may be connected to all supplies, wherein a valve, multiple valves or similar is used to switch between the respective supplies.

In a preferred embodiment, the reducing agent gas comprises hydrogen gas as reducing agent, in which case the reducing agent supply is a supply of gaseous hydrogen.

For example, the supply for hydrogen gas may be an electrolysis unit, which produces oxygen and hydrogen gas, wherein the produced hydrogen gas is provided as reducing agent to the reaction chamber of the fluidized bed reactor in step 2b), for which the hydrogen outlet of the electrolysis unit is connectable to the gas inlet of the fluidized bed reactor. In this case an oxygen storage vessel may be provided, which is connected to an oxygen outlet of the electrolysis unit, so that the produced oxygen can be stored and provided to the reaction chamber of the fluidized bed reactor in step 1b).

In order to initiate the combustion/oxidation process in step 1 the fluidized bed apparatus may comprise an ignition device which is embodied to at least locally raise the temperature to cause an exothermic combustion reaction of the particulate metal with the oxidizing agent. The ignition device is in particular embodied to provide temperatures above 1.400° C. The ignition device may be embodied as electrically operated heater or as a burner operated with gas.

Preferably, the metal of the particulate metal is of the following group:
Iron (Fe), in particular elementary iron,
Zinc (Zn), in particular elementary zinc,
Alkali metal, in particular Magnesium (Mg), preferably elementary magnesium.

Accordingly, the particulate metal oxide is iron oxide, such as $FeO$, $F_2O$, $F_3O_4$ and $Fe_2O_3$, zinc oxide, such as $ZnO$, or magnesium oxide, such as $MgO$, respectively.

The invention and the technical background will now be explained with regard to the FIGURE, which shows an exemplary embodiment of the invention.

The apparatus depicted in the FIGURE comprises a fluidized bed reactor 1 which has a reaction chamber 2 and a fluidizing bottom 8 with a plurality of nozzles 17. The nozzles 17 embody a gas inlet 4 for providing an operation gas to the reaction chamber 2. The reaction chamber 2 can be provided with particulate matter, which is fluidized by the gas provided through nozzles 17.

The reaction chamber 2 has at its upper end a reaction chamber outlet 6, through which a mixture of particulate matter and reaction gases enters a particulate matter separator 3, in which the reaction gases are separated from the particulate matter. The reaction gases may leave the particulate matter separator 3 through the top and be led to further processing, wherein a recirculation line 16 is connected to the respective outlet line. The particulate matter may leave the particulate matter separator 3 through returning line 18, which leads to the bottom of the reaction chamber 2.

A particulate metal oxide storage vessel 10 is connected to the returning line 18, wherein particulate matter may be withdrawn from the returning line 18 to the particulate metal oxide storage vessel 10 or wherein particulate matter from the particulate metal oxide storage vessel 10 may be fed to the returning line 18 and from there to the reaction chamber 2.

Furthermore, a particulate metal storage vessel 9 is provided, which is connected to a reaction chamber inlet 7 at the bottom of the reaction chamber 2, wherein particulate matter from the reaction chamber 2 can be withdrawn to the particulate metal storage vessel 9 or wherein particulate matter from the particulate metal storage vessel 9 can be fed into the reaction chamber 2. Alternatively, the metal storage vessel 9 may be connected to returning line 18. Furthermore, an inert gas (such as $N_2$) may be provided to the metal storage vessel 9.

A first group of nozzles 17 of the fluidizing bottom 8 is connected to an oxidizing agent supply 12. A further group of nozzles 17 is connected to a reducing agent supply 11 and an even further group of nozzles 17 is connected to a water steam source 20.

Additionally, an electrolysis unit 13 is embodied, which hydrogen outlet 14 is connected to the reducing agent supply 11 and which oxygen outlet 15 is connected to an oxygen storage vessel 19, which in turn is connected to the oxidizing agent supply 12. The recirculation line 16 is connected to the third group of nozzles 17 but may also be connected to any other group of nozzles.

When there is a surplus of electrical energy from renewable energy sources, the electrolysis unit 13 is operated to produce oxygen and gaseous hydrogen, wherein the oxygen is stored in the oxygen storage vessel 19. The hydrogen is supplied via the reducing agent supply 11 to the respective group of nozzles 17. At the same time particulate metal oxide from the particulate metal oxide storage vessel 10 is provided to the reaction chamber 2. The particulate matter comprising particulate metal oxide within the reaction chamber 2 is fluidized by the hydrogen, wherein a reduction reaction of the hydrogen with the particulate metal oxide takes place, so that particulate metal is produced. The particulate metal can be withdrawn via the reaction chamber inlet 7 to the particulate metal storage vessel 9. Accordingly, electrical energy is stored in solid form within the particulate metal.

If the stored energy shall be recovered, the particulate metal is fed from the particulate metal storage vessel 9 into the reaction chamber 2 and an oxidizing agent is supplied through the oxidizing agent supply 12 and its respective nozzles 17, wherein oxygen stored in oxygen storage vessel 19 may be added. The particulate matter comprising the particulate metal within the reaction chamber 2 is fluidized by the provided oxidizing agent, wherein the temperature of the fluidized bed is locally raised by an ignition device 5 in order to start an oxidation reaction. The particulate metal oxide produced in this oxidation process may be withdrawn from returning line 18 towards the particulate metal oxide storage vessel 10.

In a further process application water steam may be provided through the respective nozzles 17 into the reaction chamber 2, wherein the particulate metal provided from the particulate metal storage vessel 9 may react in the fluidized state to particulate metal oxide and hydrogen, which hydrogen can be withdrawn for further processing.

The present invention suggests that the same fluidized bed reactor 1 is once operated as reduction reactor, for example if there is a surplus of electrical energy, and is later run as oxidation reactor, when energy or hydrogen is needed.

What is claimed is:

1. A method for operating a fluidized bed apparatus, the method comprising steps of:
   (1a) providing particulate metal to a reaction chamber of a fluidized bed reactor,
   (1b) providing an oxidizing agent or steam to a fluidizing bottom of the fluidized bed reactor such that particulate matter comprising the particulate metal is fluidized, wherein the particulate metal reacts with the oxidizing agent to particulate metal oxide or with the steam to particulate metal oxide and gaseous hydrogen,
   (1c) withdrawing particulate metal oxide from the fluidized bed reactor,
   (1d) storing the withdrawn particulate metal oxide,
   (2a) providing particulate metal oxide to the reaction chamber of the fluidized bed reactor,
   (2b) providing a reducing agent containing gas to the fluidizing bottom of the fluidized bed reactor such that particulate matter comprising the particulate metal oxide is fluidized, wherein the particulate metal oxide reacts with the reducing agent to particulate metal,
   (2c) withdrawing the particulate metal from the fluidized bed reactor, and
   (2d) storing the withdrawn particulate metal.

2. The method according to claim 1, wherein the reducing agent of the reducing agent containing gas comprises hydrogen gas.

3. The method according to claim 1, wherein the step (2b) comprises:
   operating an electrolysis unit to produce oxygen and hydrogen gas, and
   providing the produced hydrogen gas as the reducing agent to the reaction chamber of the fluidized bed reactor.

4. The method according to claim 3, wherein the step (1b) comprises storing the produced oxygen and providing the stored oxygen to the reaction chamber of the fluidized bed reactor.

5. The method according to claim 1, wherein reaction gases after separation from the particulate matter are withdrawn and provided to the fluidizing bottom.

6. The method according to claim 1, wherein in the step (1a) or (1b) the temperature is temporarily raised at least locally to cause an exothermic combustion reaction of the particulate metal with oxygen.

7. A fluidized bed apparatus comprising
   a fluidized bed reactor having
      a reaction chamber for particulate matter, and
      a fluidizing bottom with at least one gas inlet for an operating gas to fluidize the particulate matter,
   a particulate metal storage connected to the fluidized bed reactor for storing particulate metal withdrawn from the fluidized bed reactor,
   a particulate metal oxide storage connected to the fluidized bed reactor for storing particulate metal oxide withdrawn from the fluidized bed reactor,
   a reducing agent supply connectable to the fluidizing bottom of the fluidized bed reactor, and
   an oxidizing agent supply or steam supply connectable to the fluidizing bottom of the fluidized bed reactor.

8. The fluidized bed apparatus according to claim 7, further comprising a recirculation line for reaction gases, the recirculation line being connectable to the fluidizing bottom.

9. The fluidized bed apparatus according to claim 7, wherein the reducing agent supply and the oxidizing agent supply are connectable to the same or to different nozzles of the fluidizing bottom.

10. The fluidized bed apparatus according to claim 7, wherein the particulate metal oxide storage vessel is connected to a returning line connecting a particulate matter separator and the reaction chamber.

11. The fluidized bed apparatus according to claim 7, wherein the particulate metal storage is connected to the reaction chamber above the fluidizing bottom.

12. The fluidized bed apparatus according to claim 7, further comprising an ignition device embodied to at least locally raise the temperature to cause an exothermic combustion reaction of the particulate metal with oxidizing agent.

13. The fluidized bed apparatus according to claim 7, further comprising a particulate matter separator associated with an outlet of the reaction chamber.

14. The fluidized bed apparatus according to claim 7, comprising
   an electrolysis unit for producing hydrogen gas and oxygen, the electrolysis unit having a hydrogen outlet for the produced hydrogen gas and an oxygen outlet for the produced oxygen,
   wherein the hydrogen outlet is connectable to a gas inlet of the fluidized bed reactor.

15. The fluidized bed apparatus according to claim 7, wherein the particulate metal is selected from a group consisting of:
   Iron (Fe),
   Zinc (Zn), and
   an alkali metal.

16. The fluidized bed apparatus according to claim 14, wherein the oxygen outlet is connected to an oxygen storage vessel which is connectable to the gas inlet of the fluidized bed reactor.

* * * * *